United States Patent [19]

Oshida

[11] Patent Number: 4,828,444
[45] Date of Patent: May 9, 1989

[54] PLASTIC PUSH-ON NUT

[75] Inventor: Tsutomu Oshida, Yokohama, Japan

[73] Assignee: Nifco Inc., Yokohama, Japan

[21] Appl. No.: 83,731

[22] Filed: Aug. 10, 1987

[30] Foreign Application Priority Data

Sep. 2, 1986 [JP] Japan .................. 61-134490[U]

[51] Int. Cl.⁴ .................................... F16B 37/00
[52] U.S. Cl. .................. 411/437; 411/512; 411/908; 411/947
[58] Field of Search ............... 411/512, 182, 183, 437, 411/433, 908, 301, 947, 519, 527, 526; 10/86 R, 86 C

[56] References Cited

U.S. PATENT DOCUMENTS

| 1,069,451 | 8/1913 | Marston | 411/437 |
| 2,288,710 | 7/1942 | Hotchkin | 411/527 X |
| 2,378,957 | 6/1945 | Tinnerman | 411/437 |
| 3,164,055 | 1/1965 | Duffy | 411/527 X |
| 3,431,813 | 3/1969 | Johnson | 411/61 |
| 3,857,349 | 12/1974 | Pritulsky | 411/437 X |
| 4,299,101 | 11/1981 | Block | 411/527 X |
| 4,657,458 | 4/1987 | Wollar et al. | 411/433 X |
| 4,671,717 | 6/1987 | Fukuhara | 411/437 X |
| 4,686,808 | 8/1987 | Triplett | 411/903 X |

FOREIGN PATENT DOCUMENTS

| 948975 | 6/1974 | Canada | 411/433 |
| 1516671 | 1/1968 | France | 411/527 |
| 2315030 | 1/1977 | France | 411/60 |
| 49-51957 | 7/1974 | Japan . | |
| 52-26060 | 4/1977 | Japan . | |
| 52-34356 | 6/1977 | Japan . | |
| 1139976 | 1/1969 | United Kingdom | 411/60 |

Primary Examiner—Lloyd A. Gall
Assistant Examiner—Curtis B. Brueske
Attorney, Agent, or Firm—Richard Bushnell

[57] ABSTRACT

This invention relates to a one-piece molded nut made of plastic which is used to secure one member to another in cooperation with a stud. The nut includes a cylindrical portion having an inner space and an engagement piece extending across the open end of the cylindrical portion.

20 Claims, 5 Drawing Sheets

PLASTIC PUSH-ON NUT

BACKGROUND OF THE INVENTION

This invention relates to a nut, which is a plastic one-piece molding used to secure one member to another in cooperation with a stud (bolt).

Heretofore, metal nuts have usually been used for fitting on bolts. However, metal nuts are heavy in weight. For this reason, a nut constituting a plastic one-piece molding which is light in weight has been desired.

One piece molded nuts made of plastic, of the type disclosed herein, are generally made by a stamping process. This process makes it difficult to form a nut having an inner wall with a female thread capable of receiving and firmly meshing with a male thread of the bolt. Thus, when a strong force is applied to the bolt in a direction away from the nut, the engagement between the female thread of the nut and the male thread of the bolt is easily released, resulting in detachment of the nut from the bolt.

OBJECT AND SUMMARY OF THE INVENTION

The object of the invention is to provide a nut as a plastic one-piece molding, which eliminates the above drawbacks and permits a sufficient and firm mesh with the male thread of the bolt so that it is safe from detachment.

To attain the above object of the invention, there is provided a plastic nut having a cylindrical portion having an inner space, with an engagement piece extending from the open end of the cylindrical portion in the direction across the open end, the outer surface of the engagement piece being provided with a female thread to be meshed with a male thread of a bolt.

With the plastic nut according to the invention the engagement piece is provided at the open end of the cylindrical portion to extend in the direction across the open end, and the outer surface of the engagement piece is provided with a female thread. Thus, it is possible to form a sufficiently deep female thread at the time of the molding. Thus, when the nut and bolt are strongly urged against each other, the engagement piece is forcibly bent into the inner space of the cylindrical portion by the end of the bolt, and the male thread of the bolt and female thread of the engagement piece firmly mesh each other, so that it is possible to withstand very strong removal force.

The above and other objects and features of the invention will become more apparent from the following detailed description with reference to the accompanying drawings.

DETAILED DESCRIPTION OF THE PREFERRED EMBODIMENT

Figure 1:
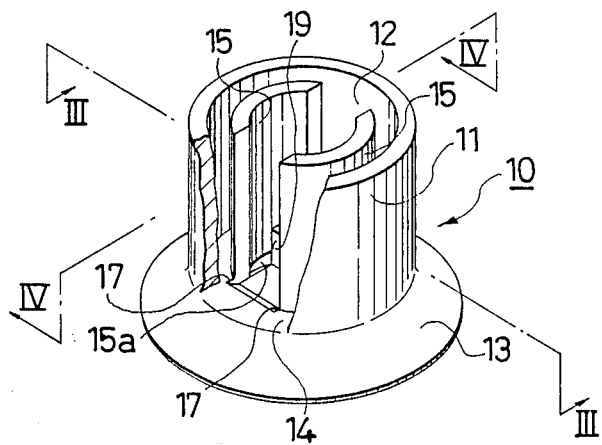
FIG. 1 is a perspective view, partly broken away, showing a first embodiment of the nut according to the invention.
Figure 2:
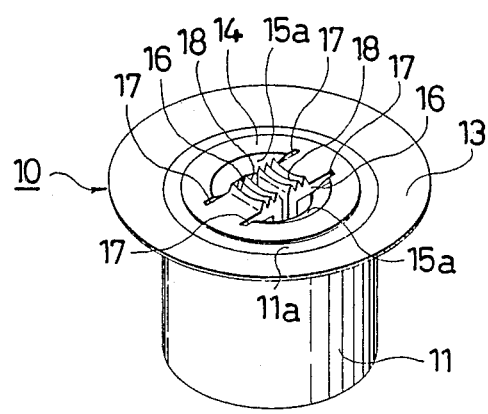
FIG. 2 is a perspective view showing the nut of FIG. 1 upside down.
Figure 3:
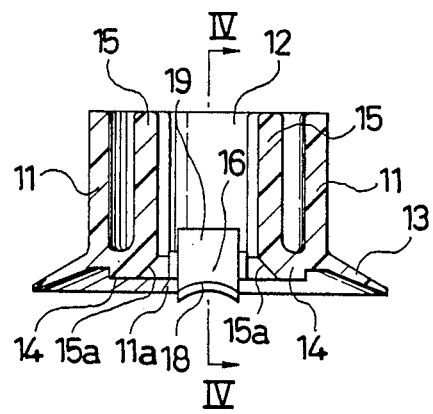
FIG. 3 is a sectional view taken along line III—III in FIG. 1.
Figure 4:
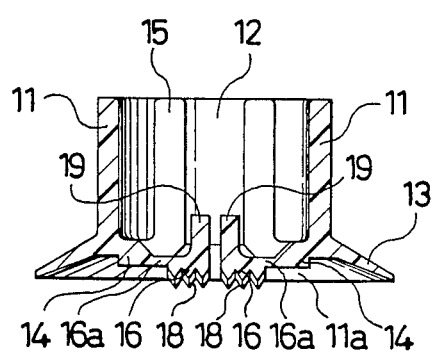
FIG. 4 is a sectional view taken along line IV—IV in FIG. 3.

FIGS. 1 to 4 show a first embodiment of the nut according to the invention. Reference numeral 10 designates a plastic one-piece molding nut, and numeral 11 a cylindrical portion having an inner space or cavity 12. An open end 11a of the cylindrical portion 11 is provided with a bevel-like elastic flange portion 13 projecting outward and downward (in FIGS. 3 and 4). The thickness of the flange portion decreases progressively in the outward direction.

The end 11a of the cylindrical portion 11 is also provided with an inner bottom edge 14. Two arcuate walls 15 extend upright and concentrically with the cylindrical portion 11 from the bottom edge 14. The inner side of the stem of the arcuate wall 15 is provided with a taper 15a to facilitate the insertion of the end of a stud.

Two engagement pieces 16 extend radially from the bottom edge 14 between the arcuate walls 15.

To facilitate inward bending of the engagement pieces 16 (upwardly in FIGS. 3 and 4), into the space 12, the stem of each engagement piece 16 is provided with reduced thickness portion 16a, and the bottom edge 14 is provided with notches 17.

The outer surface of the engagement pieces 16 is provided with female threads 18 to be meshed with the male thread of the stud when the engagement pieces 16 are bent into arcuate form with substantially the same radius of curvature as that of the arcuate walls 15 with the insertion of the stud into the nut.

The engagement pieces 16 are provided at the end with ear portions 19 which are adapted to be brought into contact with the inner surface of the cylindrical portion 1 to serve as stoppers when the engagement pieces 16 are inwardly urged and bent.

Figure 5:
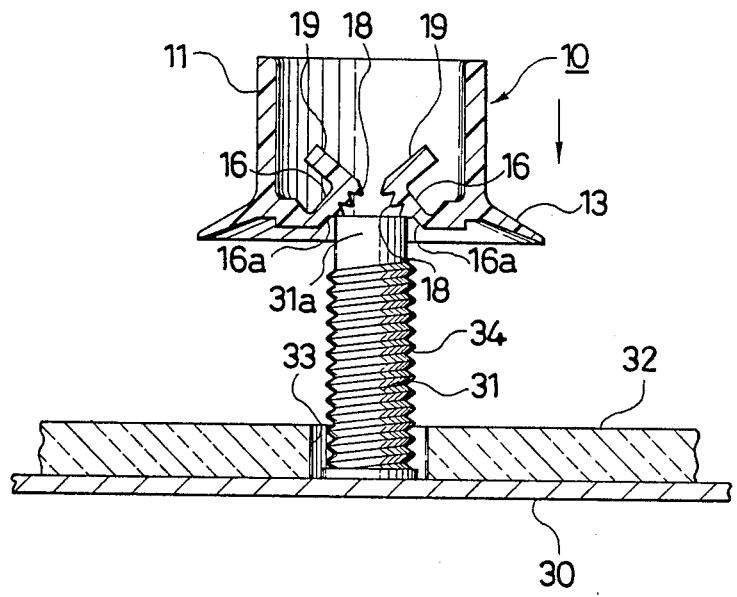
FIG. 5 is a sectional view showing the nut urged against a stud.
Figure 6A:
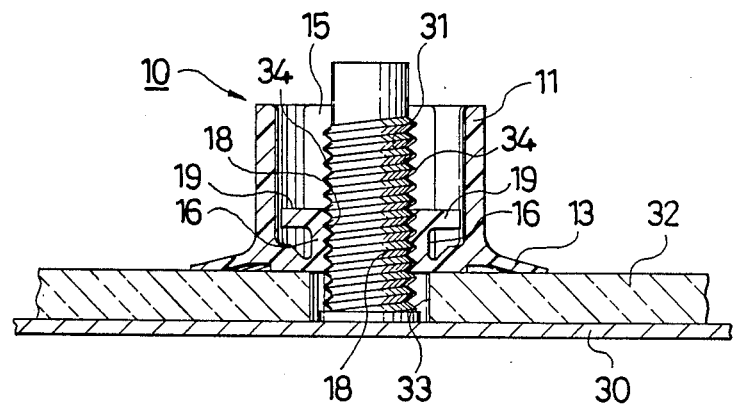
FIG. 6(a) is a sectional view showing the nut fitted on the stud.
Figure 6B:
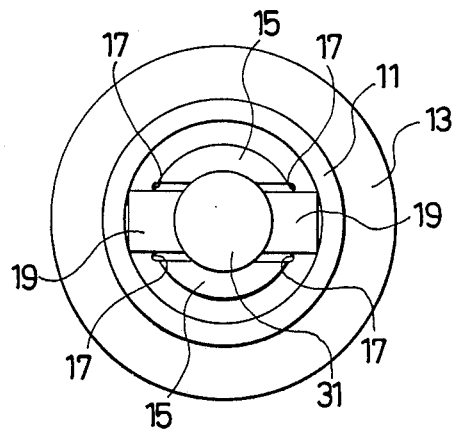
FIG. 6(b) is a plan view showing the nut fitted on the bolt.

Now, the operation of the nut 10 having the aforementioned structure will now be described. As shown in FIG. 5, when a stud 31 projecting from a mounting plate 30 is inserted through a mounting hole 33 of a member 32 to be mounted and the nut 10 is forcibly fitted on the stud 31 on the back side of the member 32 with the engagement pieces 16 of the nut 10 applied to an end 31a of the stud 31, the engagement pieces 16 are bent inwardly into the space 12 in the arcuate walls 15, as shown in FIG. 6(a). The stud 31 is inserted, the female threads 18 of the engagement pieces 16 are meshed with the male thread 34 of the stud 31, and the stud 31 is thus held between the two arcuate walls 15 as shown in FIG. 6(b).

Thus, when the nut 10 is forcibly inserted into the member 32 such that the flange portion 13 is elastically deformed, as shown in FIG. 6(a), the mounting plate 30 is firmly secured to the member 32.

With the nut 10 described above, since the female threads 18 are formed on the outer side of the engagement pieces 16, they can be formed as deep threads so that they can be meshed deeply and strongly with the male threads 34 of the studs 31.

Further, since the engagement pieces 16 are deformed elastically, the stud 31 is clamped strongly with the restoring forces of the engagement pieces 16, so that the nut can be firmly mounted. Further, since the ear portions 19 are brought into contact with the inner wall of the cylindrical portion 11, the nut 10 can be mounted very firmly.

The nut 10 can be removed from the stud 31 by turning it.

Figure 7:
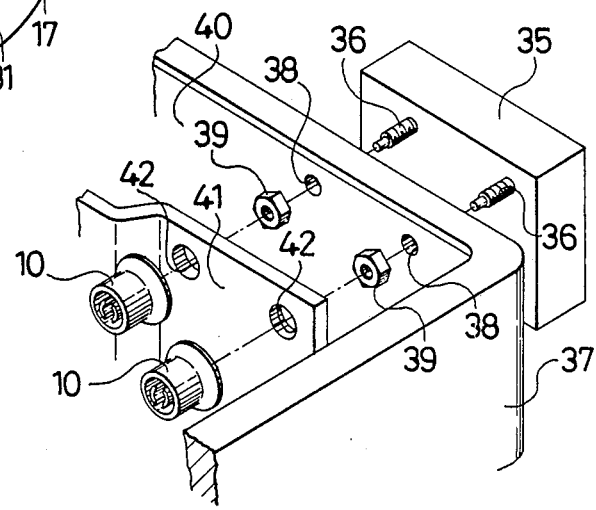
FIG. 7 is a view showing the manner in which a member with studs secured thereto is secured.

FIG. 7 shows a different example of use of the nut.

In this example, the nut is used for the securement of the trim board in the trunk of an automobile. Studs 36 embedded in a rear combination lamp 35 of an automobile are each inserted through a mounting hole 38 of the body 37 of the trunk of the automobile into the trunk 40 (on the inner side of the body 37). The end of the stud 36 is inserted through a metal nut 39 and a mounting hole 42 of the trim board 41. The stud 36 is secured by forcibly fitting the nut 10 according to the invention.

Figure 8:
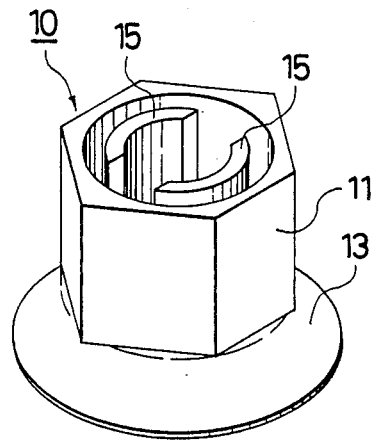
FIG. 8 is a perspective view showing a modification of the nut shown in FIG. 1.
Figure 9:
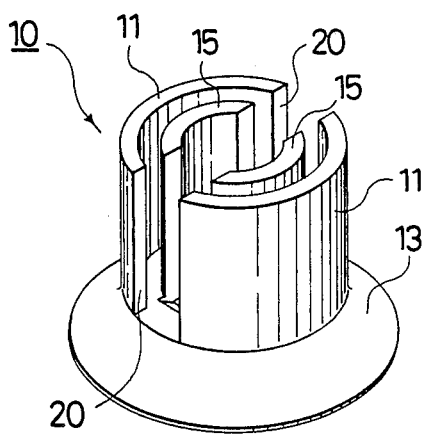
FIG. 9 is a perspective view showing a further modification of the nut shown in FIG. 1.
Figure 10:
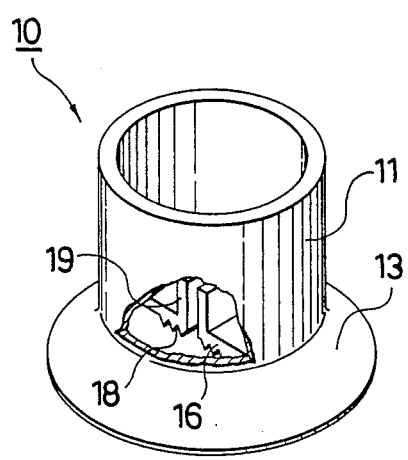
FIG. 10 is a perspective view showing a still further embodiment of the nut shown in FIG. 1.

FIGS. 8 to 10 show modifications of the plastic one-piece molding nut of the first embodiment.

In the modification shown in FIG. 8, the cylindrical portion 11 of the nut has a polygonal outer surface to facilitate the turning of the nut 10 when removing it.

In the modification of FIG. 9, the cylindrical portion 11 of the nut in the first embodiment is provided with two slits 20 to facilitate the turning of the nut.

In the modification of FIG. 10, the arcuate walls of the nut in the first embodiment are omitted.

Figure 11:
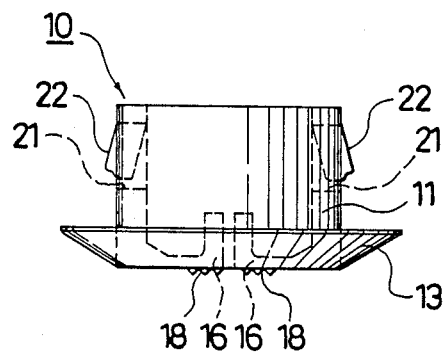
FIG. 11 is a front view showing a second embodiment of the nut according to the invention.
Figure 12:
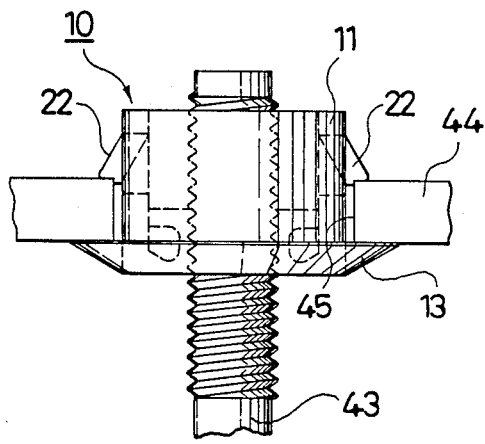
FIG. 12 is a view showing the nut of FIG. 11 fitted on a stud.

FIGS. 11 and 12 show a second embodiment of the nut according to the invention. In this embodiment, the flange portion 13 is provided in a converse fashion with respect to the first embodiment. The cylindrical portion 11 is provided with elastic engagement pieces 22 formed by U-shaped slits 21.

As shown in FIG. 12, the nut 10 is forcibly fitted on the stud 43 and mounted by forcibly bending the engagement pieces 16. Further, the cylindrical portion 11 is forcibly inserted into a hole 45 of a member 44 to be mounted by causing inward elastic deformation of the engagement pieces 22, whereby the member 44 is clamped between the engagement pieces 22 and flange portion 13.

Figure 13:
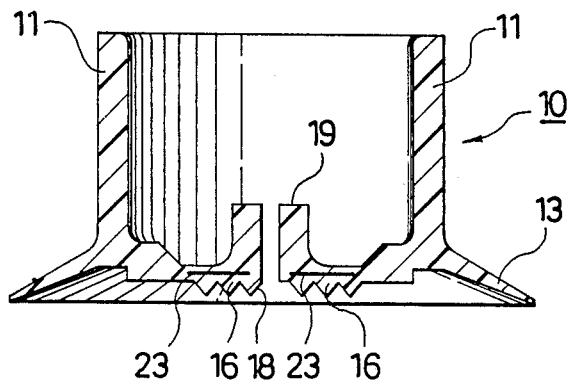
FIG. 13 is a sectional view showing a third embodiment of the nut according to the invention.

FIG. 13 shows a third embodiment of the invention.

In this embodiment, in order to reinforce the female thread surface of the engagement pieces 16 curved (or flat) metal pieces 23 are buried under the female thread surface of the engagement pieces 16 at the time of the molding. Thus, when the nut is secured by forcibly fitting it on the stud, the restoring force of the metal pieces 23 is added to the restoring force of the engagement pieces 16, so that the nut can be mounted very firmly.

While some preferred embodiments of the invention have been described above, these embodiments are by no means limitative, and various changes and modifications are possible in the details of the structure of individual parts. For example, the number of engagement pieces need not necessarily be two, but can be three or more or only one.

As has been described in the foregoing, with the plastic nut according to the invention the open end of the cylindrical portion having an inner space or cavity is provided with engagement pieces with the outer surface formed with female threads to be meshed with the male threads of the stud such that they extend across the open end.

Further, since the nut is made of a plastic material, it is light in weight compared with the conventional metal nut. Therefore, when a large quantity of nuts are used for an automobile or the like, the overall weight can be extremely reduced. Further, the nut according to the invention is very inexpensive compared with the conventional metal nut. Further, it is safe from rusting, which is very desirable in view of maintenance.

Further, since the female threads are formed on the outer side of the nut, it is possible to form a complete female thread which is far deeper than that of the prior art plastic nut. For this reason, the nut can firmly mesh with the stud and can withstand very great removing force compared to the case of the conventional plastic nut.

Further, the nut can be mounted by mere force fitting on the stud without need of turning or tightening as in the conventional nut. Thus, far superior operability can be obtained, and it is possible to greatly improve the operating efficiency in confined working spaces such as the bottom of a space in an automobile having a complicated configuration.

What is claimed is:

1. A nut in the form of a plastic one-piece molding comprising a cylindrical portion having an inner space, at least one engagement piece extending at an open end of said space across said open end, and a female thread formed on the outer surface of said engagement piece to be meshed with a male thread of a stud, said engagement piece being engageable with an inner surface of said cylindrical portion upon being deflected by a complementary threaded stud.

2. The nut according to claim 1, wherein said engagement piece includes a stem having a reduced thickness portion.

3. The nut according to claim 1, wherein an end of said engagement piece is provided with an ear portion.

4. The nut according to claim 1, wherein the outer periphery of said cylindrical portion adjacent to said open end is provided with a flange.

5. The nut according to claim 1, wherein the inner surface of said space is provided with two arcuate walls facing each other.

6. The nut according to claim 1, wherein the outer periphery of said cylindrical portion has a circular sectional profile.

7. The nut according to claim 1, wherein the outer periphery of said cylindrical portion has a polygonal sectional profile.

8. The nut according to claim 1, wherein the outer periphery of said cylindrical portion is provided with an elastic engagement piece.

9. A nut in the form of a plastic one-piece molding comprising a cylindrical portion having an inner space, at least one engagement piece extending at an open end of said space across said open end, said engagement piece including a stem having a reduced thickness portion, and a female thread formed on an outer surface of said engagement piece to be meshed with a male thread of the stud.

10. The nut according to claim 9, wherein an end of said engagement piece is provided with an ear portion.

11. The nut according to claim 9, wherein the outer periphery of said cylindrical portion adjacent to said open end is provided with a flange.

12. The nut according to claim 9, wherein the inner surface of said space is provided with two arcuate walls facing each other.

13. The nut according to claim 9, wherein the outer periphery of said cylindrical portion has a circular sectional profile.

14. The nut according to claim 9, wherein the outer periphery of said cylindrical portion has a polygonal sectional profile.

15. The nut according to claim 9, wherein the outer periphery of said cylindrical portion is provided with an elastic engagement piece.

16. A nut in the form of a plastic one-piece molding comprising a cylindrical portion having an inner space and a flange extending from an outer periphery of said cylindrical portion, at least one engagement piece extending at an open end of said space across said open end, and a female thread formed on an outer surface of said engagement piece to be meshed with a male thread of a stud.

17. The nut according to claim 16, wherein said engagement piece includes a stem having a reduced thickness portion.

18. The nut according to claim 1, wherein an end of said engagement piece is provided with an ear portion.

19. The nut according to claim 1, wherein the inner surface of said space is provided with two arcuate walls facing each other.

20. The nut according to claim 1, wherein the outer periphery of said cylindrical portion is provided with an elastic engagement piece.

* * * * *